J. D. ALLEN & J. A. CONLY.
MOTOR VEHICLE.
APPLICATION FILED JUNE 7, 1907.
983,107.
Patented Jan. 31, 1911.
2 SHEETS—SHEET 2.
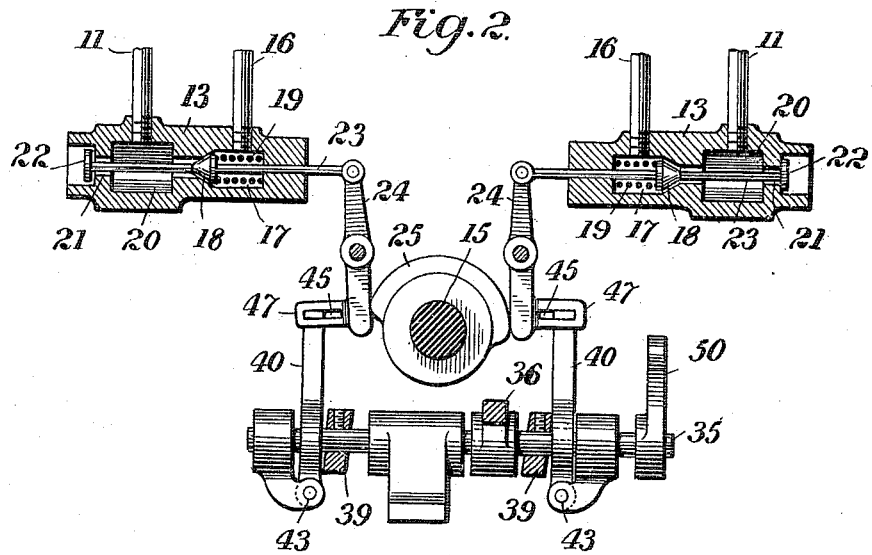
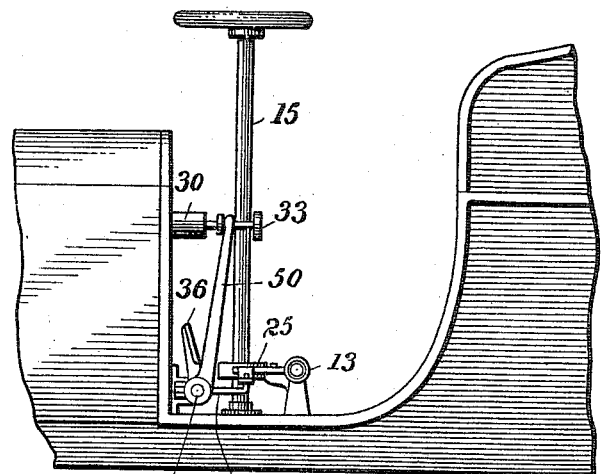
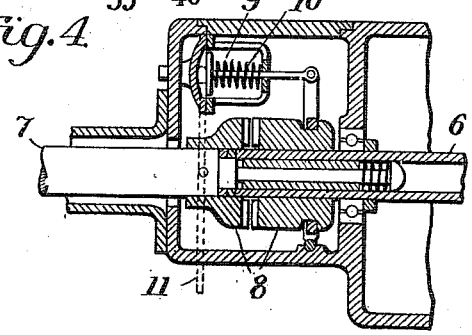
Witnesses
J. G. Hinkel
F. W. H. Clay
Inventors
J. D. Allen
J. A. Conly
by Howard A. Coombs
their Attorneys

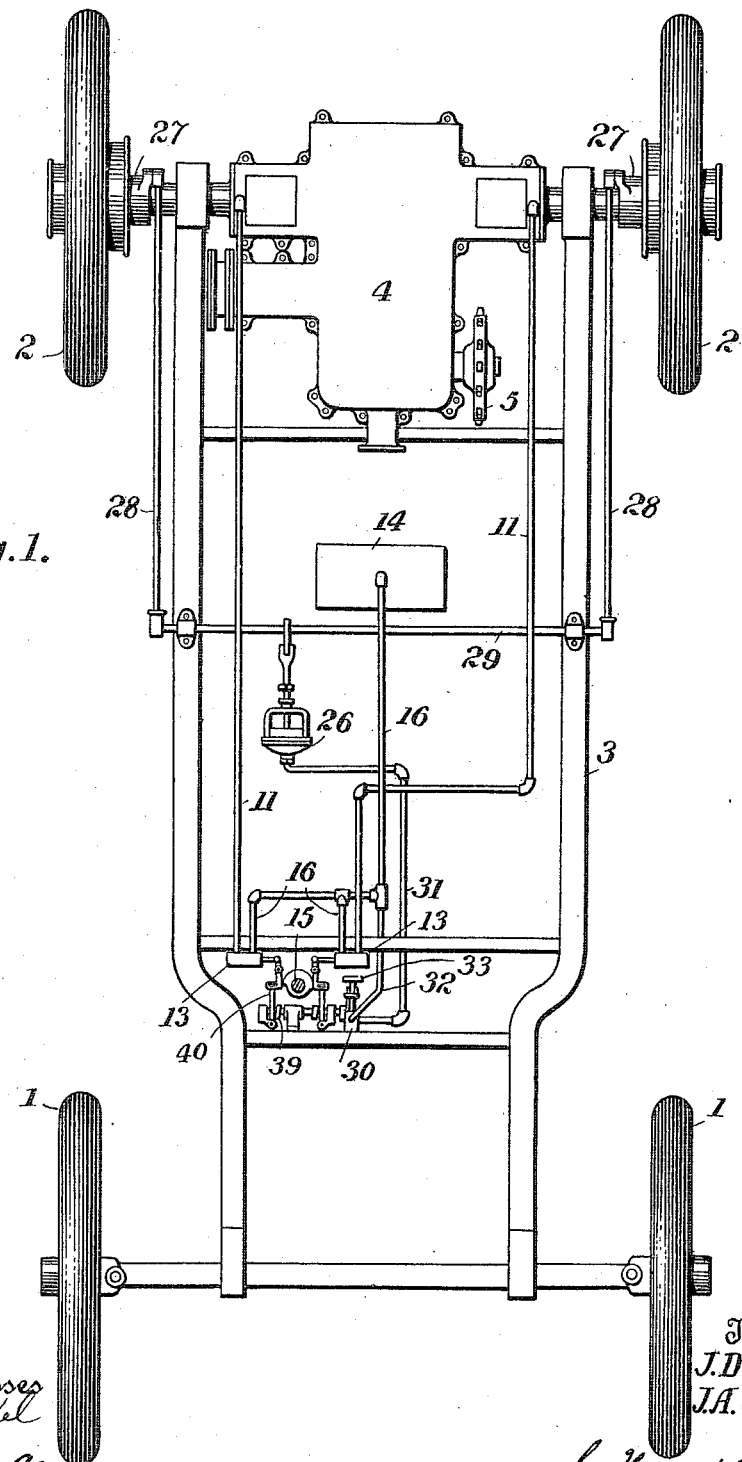

UNITED STATES PATENT OFFICE.

JOHN D. ALLEN AND JOHN A. CONLY, OF PHILADELPHIA, PENNSYLVANIA.

MOTOR-VEHICLE.

983,107.     Specification of Letters Patent.     Patented Jan. 31, 1911.

Application filed June 7, 1907. Serial No. 377,681.

*To all whom it may concern:*

Be it known that we, JOHN D. ALLEN and JOHN A. CONLY, citizens of the United States, residing at Philadelphia, in the county of Philadelphia and State of Pennsylvania, have invented certain new and useful Improvements in Motor-Vehicles, of which the following is a specification.

Our invention relates to motor vehicles, and more particularly to those in which certain elements of the transmission gear and the brake mechanism are controlled by fluid-pressure.

The object of our invention is to provide a supplementary mechanism, likewise operated by fluid-pressure, which can be manually actuated to control said elements of the transmission gear and the brake mechanism to make an "emergency stop".

In the embodiment of our invention herein described and illustrated, the rear axle of the vehicle is composed of three sections, the central one being driven by the motor, and the two outer sections, which are connected to the driven wheels of the vehicle, being driven by said central section through clutches, which are thrown out by fluid-pressure controlled by the movements of the steering-post, so that when the vehicle makes a turn, one or the other of the driven wheels is unclutched, while the brakes are thrown on by independent manually-controlled fluid-pressure mechanism.

The emergency stop mechanism which constitutes our present invention, comprises manually-operated means which acts, through fluid-pressure, to disengage both said clutches and throw on the brakes, and is entirely unaffected by the ordinary operation.

The invention will now be described in detail, reference being had to the accompanying two sheets of drawings, in which—

Figure 1, is a plan view of the running gear of a motor vehicle equipped with our invention. Fig. 2, is an enlarged detail view of the emergency stop mechanism. Fig. 3, is a partial side view of an automobile showing the emergency stop mechanism in end view, and Fig. 4, is an enlarged view of one of the rear axle clutches.

In these views 1, 1 represent the front wheels of an automobile, and 2, 2 the rear, driven wheels thereof, the axles of said wheels being supported and connected by the frame work, indicated as a whole by 3.

4 represents the casing of the transmission gear, the power being applied to the sprocket wheel 5, from the shaft of which it is transmitted to the driving shaft 6 of the rear axle by a train of gearing, not shown, contained in casing 4. Said driving-shaft 6 transmits the power to the shafts 7 of the wheels 2 through clutches 8, inclosed in the casing 4 and one of which is illustrated in Fig. 4. The sliding member of the clutch is disengaged from the fixed member by the pneumatic diaphragm motor 9, and is reëngaged by the spring 10. Fluid pressure is transmitted to the pneumatic motors 9 by the pipes 11, 11, leading to the valves 13, 13, which are controlled by the steering post 15.

14 represents an air reservoir, the pressure in which is maintained by any suitable means, and which is connected by pipes 16 to each of said valves 13. The construction of said valves is clearly shown in Fig. 2. Each of them comprises a chamber 17 into which the inlet pipe 16 opens, and which is closed by a valve 18, normally held to its seat by a spring 19, and a chamber 20, from which the outlet pipe 11 leads, and which has an air exhaust passage 21, adapted to be closed by a valve 22, carried by the stem 23 of the valve 18. When the valve 18 is closed on its seat, the valve 22 is open and vice versa. The stem 23 extends beyond the valve 18 outside of the valve-casing, and is pivotally connected to the lever 24, pivoted adjacent to the steering post, which latter carries a cam 25, which acts on the adjacent arms of levers 24 when the steering post is turned, to raise the valves 18 from their seats. In the position illustrated in Fig. 2, the right hand valve 18 is open and air is therefore being admitted from the pipe 16 to the pipe 11, leading to the right hand clutch on the rear axle, while the left hand valve 18 is closed and the corresponding valve 22 is open, so that the air is escaping from pipe 11 to the atmosphere.

26 represents a pneumatic motor for actuating the brake sleeves 27, which are connected by rods 28 with a rock shaft 29 operatively connected to the piston of the motor 26. Normally, this motor 26 is manually operated from a valve 30, mounted on the dash board of the vehicle, or at some point convenient to the driver's seat, and connected to said motor by means of a pipe 31, said valve 30 being supplied with air from the reservoir 14 by a pipe 32. This valve is similar in every respect to the valves 13, above described, except that in place of the valve stem being connected to a lever, such as 24, it is provided with a head or push button 33, by which it is manually operated when it is desired to set the brakes.

We come now to the description of the emergency stop which constitutes the essence of the present invention. This mechanism is so constructed and arranged that by a movement of the driver's foot all the valves can be simultaneously operated, which results in disconnecting both the rear wheels from the driving shaft and in setting the brakes. It consists of a rock-shaft 35 having an arm or treadle 36 connected thereto, conveniently located to be actuated by the foot. Said rock-shaft carries two spiral cams 39, which respectively act against two levers 40 pivoted at 43 to the bearings of the rock-shaft, or to some other convenient point, and surrounding said shaft loosely. The free ends of said levers are bent and engage in slots 45 formed in lugs 47 projecting from the levers 24. In addition the rock-shaft 35 carries an arm 50, arranged to bear against a collar or head on the stem of the valve 30, so that when rock-shaft 35 is rocked, said valve 30 will be actuated to admit pressure to the brake-motor 26.

It will be seen that the movements of the levers 24 by the cam 25 on the steering post will not affect the levers 40 since the slots 45 in the lugs 47 simply slide over the bent ends of said levers; but as soon as the shaft 35 is rocked said levers 40 will be swung outwardly by the cams 39, and consequently both levers 24 will be swung on their pivots to raise the valves 18 from their seats and admit the air to pipes 11 thereby throwing out the clutches of the rear wheels. At the same time, the arm 50, secured to the rock-shaft, will open valve 30 and admit air to the brake-motor 26.

By the above described mechanism we provide means whereby the driven wheels of the vehicle can be instantly disconnected from the motor and the brakes be thrown on, without its being necessary to first disengage any clutch or gear, as is usually the case. It makes no difference on what speed the car is running, a simple pressure with the foot on the emergency stop pedal will act to throw off the power and apply the brakes.

Having thus described our invention, what we claim is:—

1. In a motor vehicle, the combination with the driven wheels thereof, of a driving shaft therefor, independent clutches to connect said wheels and shaft, an independent pneumatic motor to actuate each clutch, a valve to control the pressure-supply to each motor, means on the steering post to control said valves, and independent means to actuate said valves independently of the post.

2. In a motor vehicle, the combination with the driven wheels thereof, of clutches to connect said wheels to the source of power, a pneumatic motor for each clutch, a valve for each motor controlled by the movements of the steering post and independent means to actuate said valves simultaneously.

3. In a motor vehicle, the combination with the driven wheels thereof, of clutches to connect said wheels to the source of power, a pneumatic motor for each clutch, a valve for each motor controlled by the movements of the steering post, a brake mechanism, a pneumatic motor therefor, a manually controllable valve for said motor, and independent, means for actuating all of said valves simultaneously to disengage said clutches and apply the brakes.

In testimony whereof we have affixed our signatures, in presence of two witnesses.

JOHN D. ALLEN.
JOHN A. CONLY.

Witnesses:
 HENRY H. FARLEY,
 ARTHUR J. WILLS.